(12) United States Patent  
Hollines, III et al.

(10) Patent No.: US 6,647,386 B2  
(45) Date of Patent: Nov. 11, 2003

(54) METHOD, SYSTEM, AND PROGRAM FOR REVERSE INDEX SCANNING

(75) Inventors: Robert J. Hollines, III, Salinas, CA (US); Christina Marie Lee, San Jose, CA (US); David L. Levish, San Jose, CA (US); Michael R. Shadduck, Los Altos, CA (US); Yufen Wang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 09/736,608

(22) Filed: Dec. 14, 2000

(65) Prior Publication Data

US 2002/0078047 A1 Jun. 20, 2002

(51) Int. Cl.[7] ............................................... G06F 17/30
(52) U.S. Cl. ................................................. 707/8; 707/3
(58) Field of Search ................................. 707/1, 2, 3, 8

(56) References Cited

U.S. PATENT DOCUMENTS

| | | | | |
|---|---|---|---|---|
| 5,123,104 A | * | 6/1992 | Levine et al. ................... 707/1 |
| 5,574,902 A | | 11/1996 | Josten et al. ................. 395/601 |
| 5,594,899 A | * | 1/1997 | Knudsen et al. ................ 707/2 |
| 5,717,918 A | | 2/1998 | Takayama et al. .......... 395/608 |
| 5,717,919 A | | 2/1998 | Kodavalla et al. .......... 395/608 |
| 5,758,146 A | | 5/1998 | Schiefer et al. |
| 5,826,253 A | * | 10/1998 | Bredenberg ..................... 707/1 |
| 5,832,484 A | | 11/1998 | Sankaran et al. ............... 707/8 |
| 5,835,904 A | | 11/1998 | Vicik et al. ..................... 707/1 |
| 5,918,224 A | | 6/1999 | Bredenberg ..................... 707/2 |
| 6,363,387 B1 | * | 3/2002 | Ponnekanti et al. ............ 707/1 |

OTHER PUBLICATIONS

U.S. patent application Ser. No. 09/628,600, filed on Jul. 28, 2000, entitled "Method and System For Conducting Reverse Index Scans".

D. Comer, "The Ubiquitous B–Tree", Aug. 1978, pp 121–137, source from *ACM Computing Surveys*, vol. 11 No. 2, Jun. 1979.

Vladimir Lanin et al., "A Symmetric Concurrent B–Tree Algorithm", 1986, pp 380–389. Pubished IEEE Document, Reference #CH2345–7/86/0000/0380.

Theodore Johnson et al., "A Framework for the Performance Analysis of Concurrent B–tree Algorithms" 1990, pp 273–287. Published ACM Document, Reference #089791–352–3/90/0004/0273.

V. Srinivasan et al., "Performance of B–Tree Concurrency Control Algorithms", 1991, pp 416–425. Published ACM Document, Reference #0–89791–425–2/91/0005/0416.

\* cited by examiner

*Primary Examiner*—Safet Metjahic  
*Assistant Examiner*—Cam Linh Nguyen  
(74) *Attorney, Agent, or Firm*—David W. Victor; Konrad, Raynes, Victor & Mann LLP

(57) ABSTRACT

Provided is a system, method, and program for performing a reverse scan of an index implemented as a tree of pages. Each leaf page includes one or more ordered index keys and previous and next pointers to the previous and next pages, respectively. The scan is searching for keys in the leaf pages that satisfy the search criteria. If a current index key is a first key on a current page, then a request is made for a conditional shared latch on a previous page prior to the current page. If the requested conditional shared latch is not granted, then the latch on the current page is released and a request is made for unconditional latches on the previous page and the current page. After receiving the latches on the previous and current pages, a determination is made of whether the current index key is on the current page if the current page was modified since the unconditional latch was requested. The current index key is located on the current page if the current index key is on the current page. A determination is then made of whether the located current index key satisfies the search criteria.

33 Claims, 5 Drawing Sheets

METHOD, SYSTEM, AND PROGRAM FOR REVERSE INDEX SCANNING

BACKGROUND OF THE INVENTION

1. Field of the Invention

The present invention relates to a method, system, and program for performing a reverse index scan and, in particular, serializing access to an index when performing a reverse index scan.

2. Description of the Related Art

Data records in a relational database management system (RDBMS) are maintained in tables, which are a collection of rows all having the same columns. Each column maintains information on a particular type of data for the data records which comprise the rows. One or more indexes may be associated with each table. An index is an ordered set of pointers to data records in the table based on the data in one or more columns of the table. An index is comprised of rows or index entries which include an index key and a pointer to a database record in the table having the key column values of the index entry key. An index key is comprised of key columns that provide an ordering to records in a table. The index key columns are comprised of the columns of the table, and may include any of the values that are possible for that particular column. Columns that are used frequently to access a table may be used as key columns.

Index entries are often stored in a B-tree data structure. A B-tree consists of a single root page and a number of leaf and non-leaf pages. The leaf pages store the index entries. Each index entry consists of key values and the physical address or identifier of the row or record, i.e., a RID, in the data base table which has the key value in its key columns. A non-leaf page stores key values and pointers to other index pages. An index may be searched for matching key values by an index scan. A scan of the index traverses from the root page down to the leaf page looking for the index entries that have the matching keys. The pages which store the index entries are maintained in a storage device, such as a hard disk drive or other non-volatile memory accessible to the database program.

A query can be made against an index to retrieve one or more index keys using a search key that includes values for each of the key columns. The search locates the first index entry that has a key value that matches the search key, i.e., the values in the key columns in the search key match the values for the key columns in the index entry.

A reverse index scan is a scan that moves backwards through the index keys in the pages at the leaf node level of a B-tree index. The co-pending and commonly assigned patent application entitled "Method and System for Conducting Reverse Index Scans", to Leslie Anne Cranston, Catherine S. McArthur, and Matthew Albert Huras, having U.S. application Ser. No. 09/628,600 and filed on Jul. 28, 2000, describes an implementation for reverse index scans. This Canadian patent application is incorporated herein by reference in its entirety. One problem that arises in reverse index scanning, which is addressed in the above incorporated Canadian patent application, is deadlocking. For example, deadlocking occurs when a reverse index scan holds a read or non-exclusive shared latch ("s-latch") for a page, e.g., page n, and seeks an s-latch for the previous page (n−1). At the same time, another index update transaction holds an exclusive latch ("x-latch") on page (n−1) and seeks an x-latch on page n in order to split the page n. In such a situation a deadlock would occur because the update transaction needs a latch on page n, but cannot obtain such latch to proceed because the reverse scan transaction holds the s-latch for page n. Likewise, the reverse scan transaction cannot obtain the s-latch needed on page (n−1) to proceed because the update transaction holds the x-latch to page (n−1). Thus, both transactions are waiting for the other to release the latch, thereby resulting in a deadlock.

There is a need in the art for improved techniques for handling reverse scanning in a manner that prevents a deadlock from occurring and, at the same time, optimizes system performance during reverse index scans.

SUMMARY OF THE PREFERRED EMBODIMENTS

Preferred embodiments disclose a system, method, and program for performing a reverse scan of an index implemented as a tree of pages. Each leaf page includes one or more ordered index keys and previous and next pointers to the previous and next pages, respectively. The scan is searching for keys in the leaf pages that satisfy the search criteria. If a current index key is a first key on a current page, then a request is made for a conditional shared latch on a previous page prior to the current page. If the requested conditional shared latch is not granted, then the latch on the current page is released and a request is made for unconditional latches on the previous page and the current page. After receiving the latches on the previous and current pages, a determination is made of whether the current index key is on the current page if the current page was modified since the unconditional latch was requested. The current index key is located on the current page if the current index key is still on the current page. A determination is then made of whether the located current index key satisfies the search criteria.

Still further, a determination is made of whether the previous page was involved in a structural modification if the current page was not modified. If the previous page was not involved in a structural modification, then a last key on the previous page is accessed. In such case, the accessed previous page becomes the current page and the accessed last key becomes the current key in continuing the reverse index scan.

Yet further, if the previous page was involved in a structural modification, then the current index key is saved and a request is made for a tree latch to prevent another process from performing a subsequent structural modification to the tree. After receiving the tree latch, a determination is made of a prior non-leaf page that includes the saved current index key. A forward traversal is made from the determined non-leaf node to a leaf page including the saved current index key.

In yet further embodiments, when initially traversing the tree to access the current page, page stack information on the non-leaf pages traversed is saved including key bounds of the non-leaf pages. A relationship of the non-leaf pages can be determined from the page stack. In such case, determining the prior non-leaf node that includes the current index key comprises using the page stack to determine a closest non-leaf page including the saved current index.

Preferred embodiments provide an algorithm and data structures for performing reverse index scans that avoids a deadlock from occurring with a transaction structurally modifying the arrangement of pages in the tree. In the preferred embodiments, the reverse scan transaction releases a shared latch on the current page to allow a structural modification to the tree affecting the current page to complete the update. Further, preferred embodiments use a tree latch system to prevent subsequent tree structure modifying transactions from starving the reverse index scan. To prevent starvation, the reverse index scan is provided a latch on the entire tree after any preexisting structure modifying transactions complete modifying the arrangement of pages in the tree. This latch prevents subsequent structure modifying transactions from blocking the reverse index scan. After the reverse index scan moves to the key prior to the current key, it may then release the tree latch to allow structure modifying transactions access to the tree.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
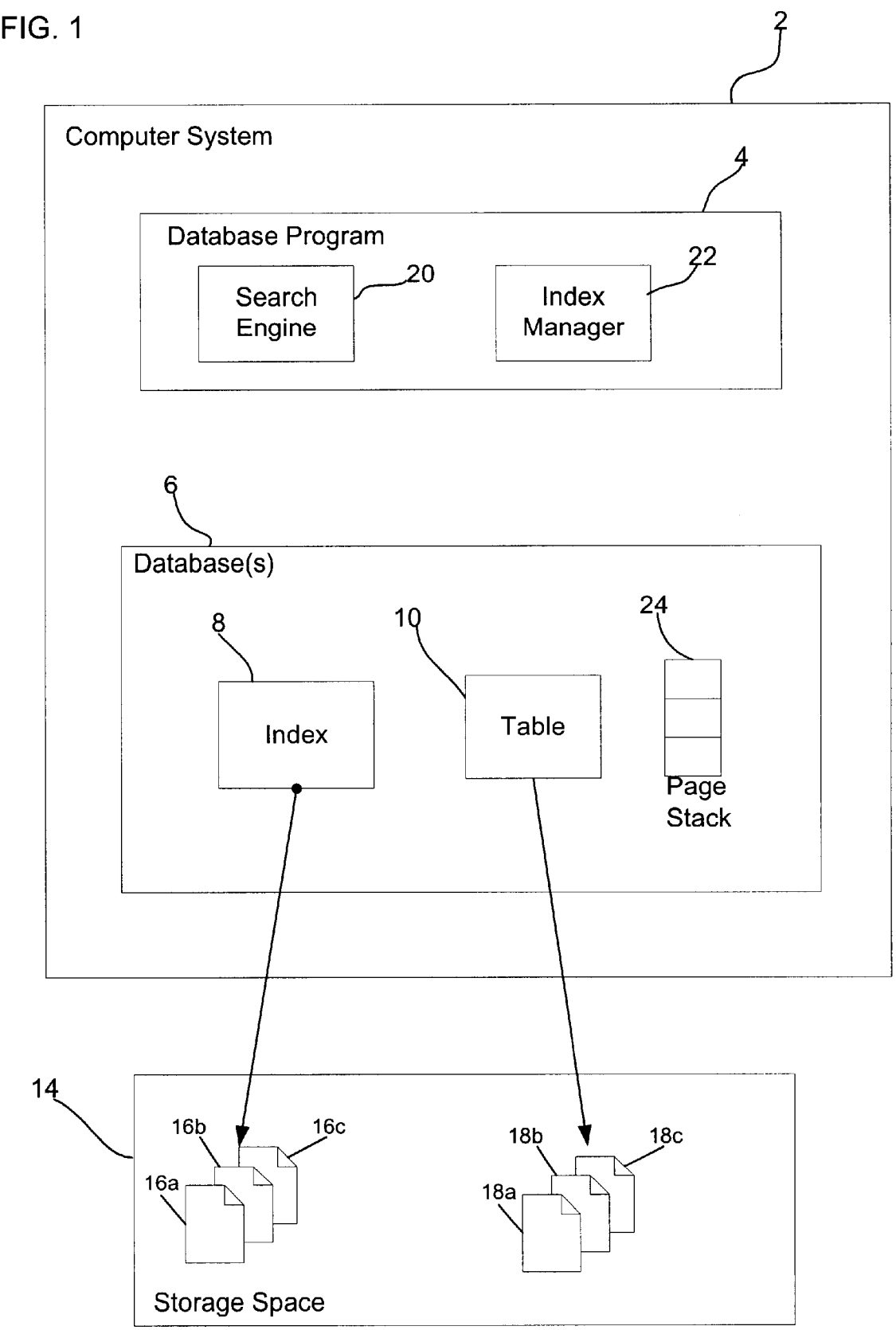
FIG. 1 is a block diagram illustrating a computing environment in which preferred embodiments of the present invention are implemented.

FIG. 1 illustrates a computing environment in which a database may be implemented. A computer system 2, which may be a computer including an operating system such as MICROSOFT WINDOWS 98 and WINDOWS NT, AIX, OS/390, OS/2, MVS, etc., includes a database program 4, such as DB2, MICROSOFT Access, Oracle Corporation's ORACLE 8, etc. The database program 4 is used to access database information maintained in one or more databases 6. The database(s) 6 may consist of one or more indexes 8 and one or more tables 10. The indexes 8 provide an ordered set of pointers to data in the table 10 based on the data in one or more columns of the table. Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

**Microsoft, Windows, and Windows NT are registered trademarks of Microsoft Corporation; DB2, AIX, OS/390, and OS/2 are registered trademarks of IBM, MVS is a trademark of IBM; and Oracle8 is a trademark of Oracle Corporation.

A storage space 14 stores the actual data sets that include the data for the indexes and tables. The storage space 14 includes the pages 16a, b, c which contain the index entries for the index 8, such as the leaf pages when the index 8 is comprised of a B-tree. The storage space 14 further includes pages 18a, b, c of the records in the table 10. The storage space 14 may comprise a non-volatile storage space, such as a direct access storage device (DASD), which is comprised of numerous interconnected hard disk drives. Alternatively the storage space 14 may comprise storage pools within non-volatile memory, or a combination of non-volatile and volatile memories. When an index entry is qualified by scanning the index 8 to find entries that match a search predicate, then the page 16a, b, c containing that index entry is transferred into a volatile, memory area within the computer system 2, such as a RAM, DRAM, etc., where it may then be processed by the database program 4.

Moreover, in preferred embodiments, during an initial traversal of the tree, the index manager 22 (FIG. 1) stores information on each page in a page stack 24. For each page, the index manager 22 stores a page record including a page number for the page; a log sequence number, which is a sequence number assigned to pages sequentially as changes to pages are logged; and a high and low key values on the page, indicating the key bounds of the page.

Figure 2:
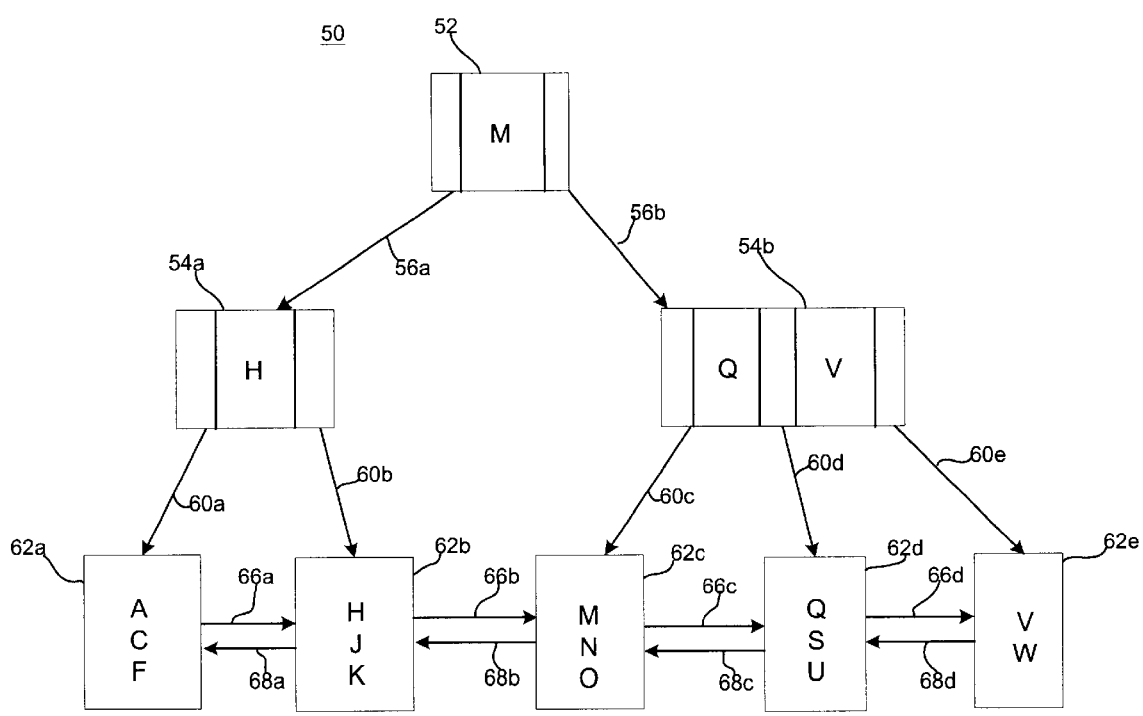
FIG. 2 illustrates an example of a B-tree data structure in accordance with the preferred embodiments of the present invention.

In preferred embodiments, the index 8 is organized as a B+ tree. FIG. 2 illustrates an organization of the index 6 as a B+ tree 50 having as keys the letters of the alphabet. In the described embodiments, the B+ tree 50 orders the letters in ascending order. Each node comprises a page including one or more keys. The root node 52 and non-leaf nodes 54a, b comprise a page of one or more key values that are used to provide a path through the nodes when searching for a key that satisfies a criteria. The root node 52 includes one key "M" with a pointer 56a to a side of the tree 50 including key values less than "M" and a last page pointer that points to a side of the tree including key values equal to or greater than the "M" key of the root node 52. The non-leaf pages 54a, b each include one pointer 60a, c, d for each key and a last page pointer 60b, e to point to the side of the tree 50 having key values greater or equal to the highest key value in the non-leaf page, which in the case of node 54b is the "V" key. For, instance, node 54a has a pointer 60a for the "H" key and last page pointer 60b, and node 54b has pointers 60c and 6d for keys "Q" and "V" respectively, and last page pointer 60e.

The leaf nodes 62a, b, c, d, e comprise pages that each include one or more keys. Each key is associated with a record identifier (RID), which identifies the location of the record in the database table 10. To move backward from a leaf node 62a, b, c, d, e to the parent non-leaf node 54a, b, the page stack 24 is used to determine the previous non-leaf node accessed before accessing the leaf node. Further, each leaf page 62a, b, c, d includes a next pointer 66a, b, c, d to the next leaf page including succeeding keys. Each leaf page 62b, c, d, e also includes a previous pointer 68a, b, c, d to a previous leaf page including preceding key values. The next 66a, b, c, d and previous 68a, b, c, d pointers enable a scan in either the forward or reverse directions along the leaf pages 62a, b, c, d, e at the bottom of the tree. Those skilled in the art will appreciate that the B+ Tree may include additional levels of non-leaf nodes and pages as more key values are added to the index 8.

An index transaction would search the B+ tree 50 index for a key that satisfies the query predicates. The branch taken at a node depends on the outcome of a comparison of the query key and the high key stored at the node. The non-leaf node is searched until a high key is found, where the query key is less than the high key. The page pointer from the found high key is followed down to the next level of the tree.

The index manager 22 may initiate multiple transactions that concurrently access the tree. In the prior art, when the transactions only scanned forward, then a forward scan transaction would wait until an update transaction completed modifying a page before proceeding. If transactions can only scan forward, then there is no risk of a deadlock. However, a deadlock situation may occur when transactions are capable of reverse scanning. Preferred embodiments utilize the following data structures, flags, and variables with the logic of FIGS. 3–5 to provide a concurrency control technique that ensures that deadlocks do not occur in indexes where both forward and reverse scanning are allowed.

page x-latch: an exclusive (x) page latch obtained by a transaction for a page when modifying a page. An x-latch prevents any other transaction from accessing the page.

page s-latch: a non-exclusive (shared (s)) page latch obtained by a transaction for a page when scanning or reading the keys in the page. An s-latch permits other non-exclusive transactions, such as read scanning transactions, to concurrently access the page, but prevents exclusive transactions, such as inserting, deleting or splitting transactions, from accessing the page.

x-tree latch: An exclusive latch on the entire tree set by a transaction performing a structural modification (a page split, page deletion, etc.) in the B+ tree.

s-tree latch: A non-exclusive latch on the entire tree for scanning or reading pages in the tree. The s-tree latch prevents any other transaction from performing a structural modification of the tree while the reverse scan transaction holds the s-tree latch. An s-tree latch is not granted if another transaction has an x-tree latch on the tree.

The serialization page and tree latches described above could be locks or some other serialization mechanisms other than the latch mechanisms described herein.

Moreover, in preferred embodiments, during an initial traversal of the tree, the index manager 22 (FIG. 1) stores information on each page in the page stack 24. For each page, the index manager 22 stores a page record including a page number for the page; a log sequence number, which is a sequence number assigned to pages sequentially as changes to pages are logged; and a high and low key values on the page, indicating the key bounds of the page.

As discussed above, a transaction initiated by the index manager 22 performing a structure modification, i.e., splitting or deleting a page, would have to acquire both an x-latch for the page being modified and a x-tree latch for the entire tree. In preferred embodiments, only one update transaction can modify the structure of the tree at a time and would block other update transactions with the x-tree latch. Further, a scanning transaction can block an update transaction on the tree by obtaining an s-tree latch. The update transaction also needs to acquire the x-latch for the page it is updating, and releases the x-latch after updating the page.

Figure 3:
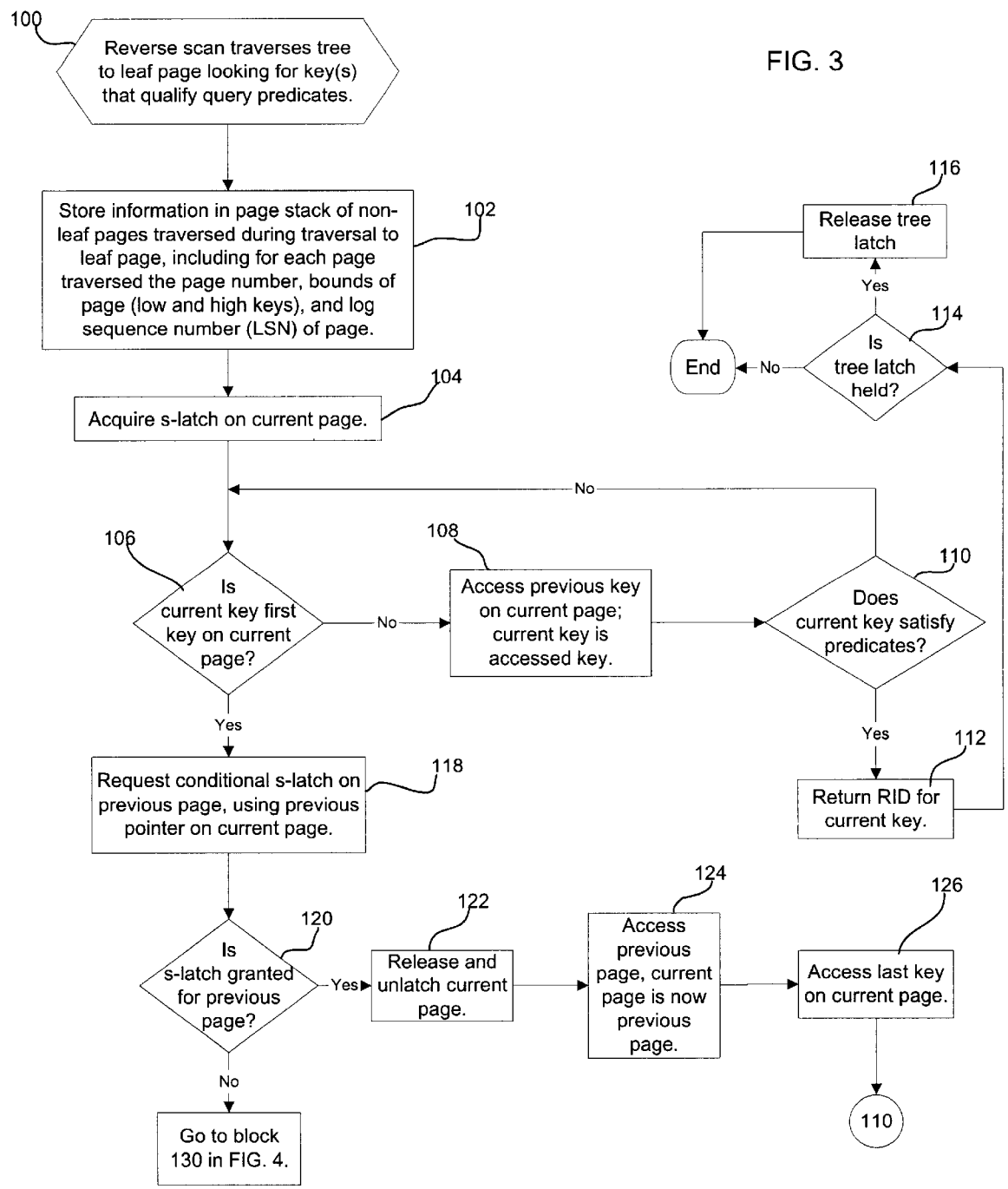
FIGS. 3–5 illustrate logic to perform a reverse index scan transaction in accordance with preferred embodiments of the present invention.
Figure 4:
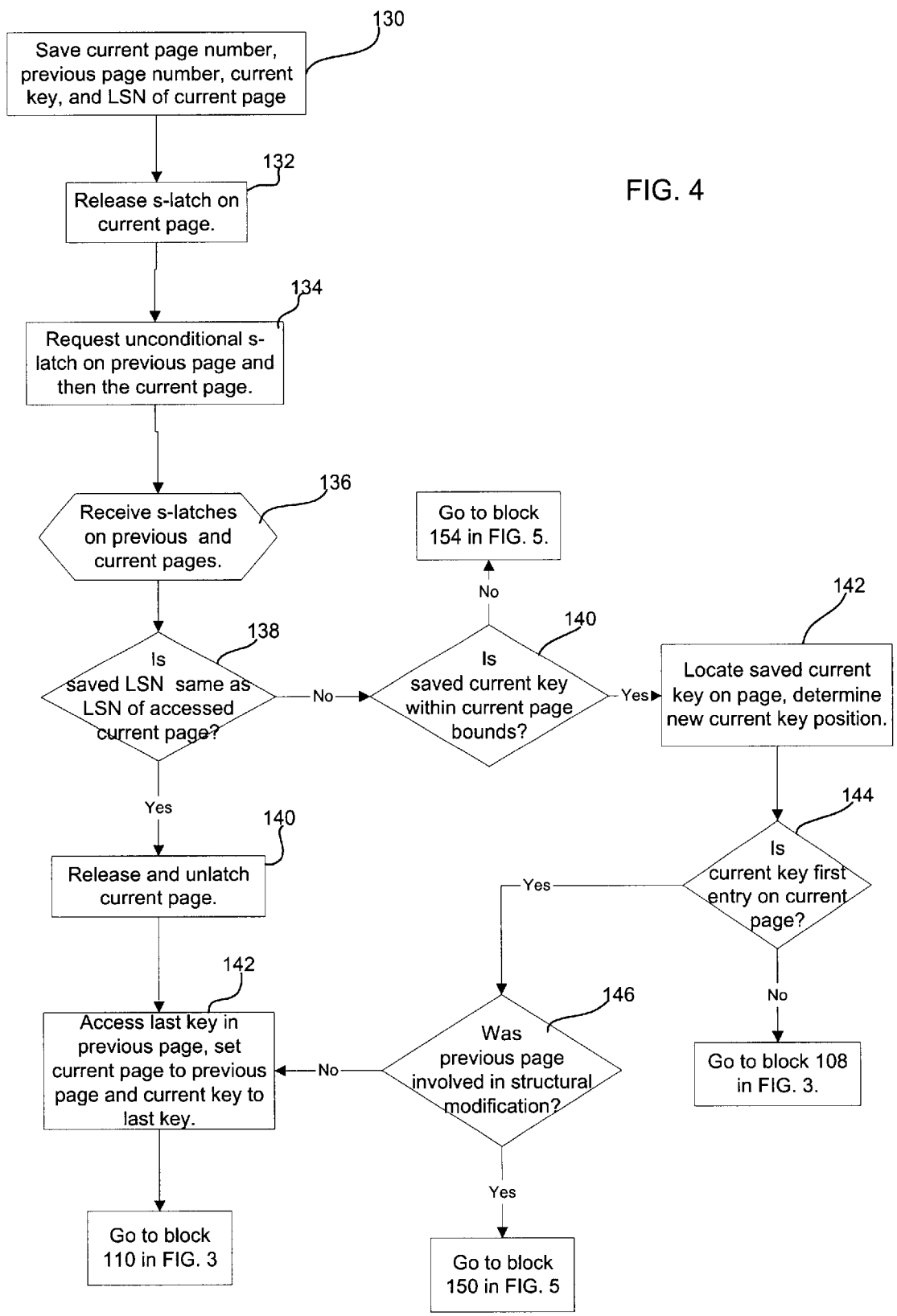
Figure 5:
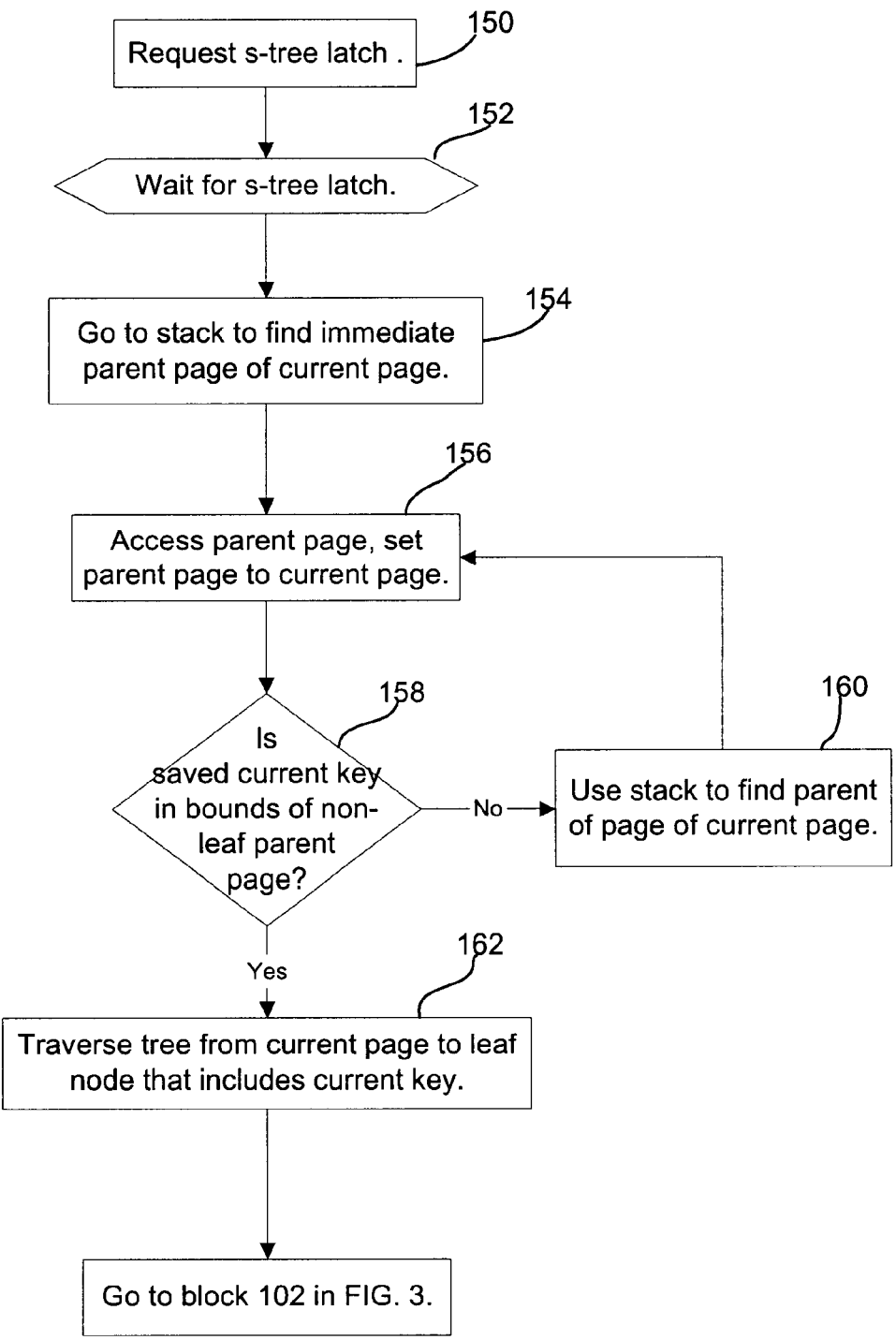

FIGS. 3–5 illustrate program logic implemented in the index manager 22 to initiate a reverse scan transaction of the index 8, which comprises a tree 50. The reverse scan transaction traverses the tree to a leaf page using the pointers on the non-leaf nodes. The reverse scan transaction would search for keys in a leaf page from the last key to the first, and then uses one of the previous pointers 68a, b, c, d to access the previous page and last key therein to continue scanning. The logic of FIGS. 3–5 is used by the reverse scan transaction to serialize access to pages in the tree and to avoid starvation of the reverse access. Control begins at block 100 in FIG. 3 with the reverse scan transaction traversing the non-leaf pages of the B+ tree 50 using the pointers to access a leaf page that would include keys that satisfy the query. While traversing the tree, the reverse scan transaction would store (at block 102) information on each traversed non-leaf and leaf page in the page stack 24, including the page number, bounds of the page (low and high keys), and log sequence number (LSN) of the page. In this way, the page stack 24 provides a path of the pages accessed during a tree traversal. The reverse scan transaction would then obtain (at block 104) an s-latch (shared latch) for non-exclusive access to the current leaf page first accessed when traversing down the tree. The first key in the leaf page accessed by the reverse scan transaction would be the last key in the leaf page. The current key would be set to the last key and a current page would be set to the accessed leaf page. When scanning through the keys in a page, the reverse index scan holds an s-latch on the page.

When reverse scanning through key entries in the leaf pages, if (at block 106) the current key is not the first key on the leaf page, then the reverse scan transaction accesses (at block 108) the previous key on the current page and sets the current key to the accessed previous key. If (at block 110) the current key does not satisfy the key predicates, then control returns to block 106 to consider the next previous key. Otherwise, the reverse scan transaction returns (at block 112) the RID for the accessed current key. If (at block 114) a tree latch is held, then the tree latch is released (at block 116) before control ends.

If (at block 106) the current key is the first key on current page, then the reverse scan transaction requests (at block 118) a conditional s-latch (shared latch) on the previous page addressed by the previous pointer 68a, b, c, d on the current page. If (at block 120) the s-latch on the previous page is granted, then the reverse scan transaction releases and unlatches (at block 122) the current page, accesses (at block 124) the previous page, sets the current page to the previous page, and then accesses (at block 126) the last key on the current page. Control then proceeds to block 110 to determine whether the accessed last key satisfies the search predicates.

If (at block 120) an s-latch was not granted, then the reverse scan transaction takes steps to avoid a deadlock. Because the denied request was for a conditional s-latch, the reverse scan transaction saves (at block 130 in FIG. 4) the current page number, current key, previous page number, and log sequence number (LSN) assigned to the current page. The previous page number can be determined using the previous page pointer 68a, b, c, d to access the previous page and obtain information thereon. The reverse scan transaction then releases (at block 132) the s-latch it holds on the current page. This release operation avoids a deadlock by allowing any transaction performing a structural modification with respect to the current page to complete the update to obtain an x-latch on the current page and complete the structural modification.

After releasing the s-latch, the reverse scan transaction requests (at block 134) an unconditional s-latch on the previous page and then the current page. Upon receiving (at block 136) both s-latches on both the current page and previous page, the reverse scan transaction determines (at block 138) whether the saved log sequence number (LSN) for the current page is the same as the determined LSN of the current page. The log sequence number (LSN) indicates when the page was last modified. If the current page was modified, i.e., log sequence number has changed, then the reverse scan transaction determines (at block 140) whether the saved current key is located on the current page, i.e., within the high and low key bounds of the current page. This determination is made because the current page may have been modified by inserting and deleting keys in the current page other than the current key. If the saved current key is still within the current page, then the reverse scan transaction locates (at block 142) the saved current key on the page. If (at block 140) the current key is not within the page bounds, then control proceeds to block 154 in FIG. 5 to traverse backwards through the tree to the previous parent page.

After the current key is located (at block 142) on the page, if (at block 144) the current key is not the first entry on the current page, then control proceeds to block 108 in FIG. 3 to move to the previous key on the current page. Otherwise, if the current key is the first entry on the current page (at block 144), then the reverse scan transaction determines (at block 146) whether the previous page was involved in a structural modification. A structural modification can be detected using the information saved at block 130, including the current page number and previous page number. There would have been no structural modification affecting the reverse scan if the next pointer of the previous page points to the saved current page number.

If there was no structural modification to the previous page that would affect the reverse index scan, then the reverse scan transaction accesses (at block 142) the last key in the previous page, sets the current page to the previous page and the current key to the accessed last key, which is the previous key to the first key on the page when the s-latch was released. Control then proceeds back to block 110 in FIG. 3 to determine whether the new current key satisfies the predicates. Otherwise, if the previous page was structurally modified, then control transfers to block 150 in FIG. 5.

If (at block 138) the log sequence number (LSN) has not changed, then the latch on the current page is released (at block 148) and control proceeds to block 150 to access the last key in the previous page. Note, that if the log sequence number (LSN) has not changed, then the current key would be the first key on the page, because this whole process is triggered when the reverse scan transaction is at the first key on the page and needs to access the previous page to continue reverse scanning.

If (at block 146) previous page was structurally modified, then the reverse scan transactions requests (at block 150 in FIG. 5) an s-tree latch. The current key would no longer be found in the current page if a structural modification to the tree deleted the current page, changed the current page from a leaf node to a non-leaf node, changed the current page to no longer point to the same previous page, etc. Upon receiving the s-tree latch (at block 152), the reverse scan transaction then has to locate the leaf page that includes the saved current key. To accomplish this, the reverse scan transaction accesses (at block 154) the page stack 24 to locate (at block 156) the immediate parent page to the current page, and sets the parent page to the current page. If (at block 158) the saved current key is not bounded by the non-leaf parent page, then the reverse scan transaction uses (at block 160) the page stack 24 to find the parent page of the current page, i.e., grandparent page, and then returns to block 156 to determine whether the current key is bounded in this next considered parent page (grandparent page). The transaction continues to move up the tree using the page stack 24 until it hits the root page or finds a non-leaf page where the saved current key is bounded. If the saved current key is bounded in the non-leaf parent page, then the reverse scan transaction traverses (at block 162) the tree from the current non-leaf page to the leaf page that includes the current key and proceeds to block 102 in FIG. 3 to locate the key.

With the preferred logic of FIGS. 3–5, the s-tree latch prevents a subsequent updating transaction from blocking the reverse scan transaction from accessing the previous key when the reverse scan transaction had to release its s-latch to allow the updating transaction to complete to avoid a deadlock. After the updating transaction completes the structure modification, the s-tree latch is granted to the reverse scan transaction in order to prevent subsequent updating transactions from further blocking the reverse scan transaction until it has accessed the previous key. This prevents continual updating transactions from starving the reverse index scan from accessing the previous key.

Preferred embodiments thus provide different locks and latches to serialize access to a tree. Further, preferred embodiments are especially useful for reverse scanning transactions to prevent a deadlock from occurring with a forward updating transaction. Further, with the preferred logic, the reverse scan transaction does not have to start at the root node 52 if the saved current key is not located on the current page prior to the release. Instead, the preferred logic traverses backwards through the tree to the closest parent in which the saved current key is bounded. In this way, the searching can start over from that non-leaf page in which the current key is bounded that is closest to the saved current page that was structurally modified.

The preferred logic described herein for a reverse scan transaction can be used by any transaction that is reverse scanning through an index. For instance, a dynamic scrollable cursor that points to index rows that satisfy a predicate clause declared with the cursor may utilize the preferred logic and data structures when scrolling backwards through the index to locate an nth entry satisfying the cursor predicates.

Following are some alternative embodiments.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to a search engine and index manager program components. However, in further embodiments, the functions performed by the index manager and search engine may be bundled in a single program component or located in additional program components.

Preferred embodiments were described with respect to an index tree that is searched as a B+ tree. The index of the preferred embodiments may be implemented as any type of B-tree or variant thereof, such as a B-tree, B link tree, etc., or a non-B tree implementation known in the art.

The algorithm of the preferred embodiments was described as having particular steps in a particular order. However, alternative algorithms in accordance with the invention may include modifications, deletions, and/or additions to the steps described in the preferred embodiment algorithms.

Preferred embodiments disclose a system, method, and program for performing a reverse scan of an index implemented as a tree of pages. Each leaf page includes one or more ordered index keys and previous and next pointers to the previous and next pages, respectively. The scan is searching for keys in the leaf pages that satisfy the search criteria. If a current index key is a first key on a current page, then a request is made for a conditional shared latch on a previous page prior to the current page. If the requested conditional shared latch is not returned in response to the request for the conditional shared latch, then the latch on the current page is released and a request is made for an unconditional latch on the previous page and the current page. After receiving the latch on the previous and current pages after the requested conditional shared latch is not returned, a determination is made of whether the current index key is still on the current page if the current page was modified since the unconditional latch was requested. The current index key is located on the current page if the current index key is on the current page. A determination is then made of whether the located current index key satisfies the search criteria.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing a reverse scan of an index implemented as a tree of pages, wherein each leaf page includes one or more ordered index keys and previous and next pointers to the previous and next pages, respectively, and wherein the scan is searching for keys in the leaf pages that satisfy the search criteria, comprising:

if a current index key is a first key on a current page, then requesting a conditional shared latch on a previous page prior to the current page;

if the requested conditional shared latch is not granted, then releasing the latch on the current page and requesting unconditional latches on the previous page and the current page;

after receiving the latch on the previous and current pages in response to requesting the unconditional latches, then determining whether the current index key is on the current page if the current page was modified since the unconditional latch was requested;

locating the current index key on the current page if the current index key is on the current page; and determining whether the located current index key satisfies the search criteria.

2. The method of claim 1, wherein each key is associated with a location identifier of a record in a database table the key represents, further comprising:

determining whether each accessed key satisfies a search criteria; and returning the location identifier associated with each key that satisfies the search criteria when reverse scanning through the pages of the index.

3. The method of claim 1, further comprising:

if the requested shared latch on the previous page is returned in response to the request for the conditional shared latch, then performing:

(i) accessing the previous page prior to the current page;

(ii) accessing a last key on the previous page, wherein the accessed previous page becomes the current page and the accessed last key becomes the current key in continuing the reverse index scan.

4. The method of claim 1, if the current index key is not the first key on the current page, then after determining whether the current index key satisfies the search criteria, accessing the key prior to the current key on the current page, wherein the accessed prior key becomes the current key in continuing the reverse index scan.

5. The method of claim 1, further comprising:

determining whether the previous page was involved in a structural modification if the current page was not modified; and if the previous page was not involved in a structural modification, then accessing a last key on the previous page, wherein the accessed previous page becomes the current page and the accessed Last key becomes the current key in continuing the reverse index scan.

6. The method of claim 5, further comprising:

after the shared latch is not returned in response to the conditional shared latch and before requesting the unconditional shared latches on the current page and the previous page, saving a sequence number for the current page and page numbers of the current page and previous page, wherein determining whether the current page was modified comprises determining whether the sequence number for the current page has changed, and wherein determining whether the previous page was involved in a structural modification comprises determining whether the next pointer for the previous page points to the saved page number of the current page.

7. The method of claim 5, further comprising:

if the previous page was involved in a structural modification, then saving the current index key and requesting a tree latch to prevent another process from structurally modifying pages in the tree;

after receiving the tree latch, determining a prior non-leaf page that includes the saved current index key; and traversing forward from the determined non-leaf node to a leaf page including the saved current index key.

8. The method of claim 7, further comprising:

when initially traversing the tree to access the current page, saving in a page stack information on the non-leaf pages traversed including key bounds of the non-leaf pages, wherein a relationship of the non-leaf pages can be determined from the page stack, and wherein determining the prior non-leaf node that includes the current index key comprises using the page stack to determine a closest non-leaf page including the saved current index.

9. The method of claim 7, further comprising:

after traversing forward to the leaf page including the current index page, accessing a previous key in the leaf page or a previous leaf page; and releasing the tree latch after accessing the previous key.

10. The method of claim 1, wherein the tree comprises a B-tree with one or more levels of non-leaf pages that include keys and pointers to a path to one or more leaf pages including the keys.

11. The method of claim 1, wherein the unconditional latch on the current page is requested after receiving the unconditional latch on the previous page.

12. A system for performing a reverse scan of an index implemented as a tree of pages, wherein each leaf page includes one or more ordered index keys and previous and next pointers to the previous and next pages, respectively, and wherein the scan is searching for keys in the leaf pages that satisfy the search criteria, comprising:

means for requesting a conditional shared latch on a previous page prior to the current page if a current index key is a first key on a current page;

means for releasing the latch on the current page and requesting unconditional latches on the previous page and the current page if the requested conditional shared latch is not granted;

means for determining whether the current index key is on the current page after receiving the latch on the previous and current pages in response to requesting the unconditional latches and if the current page was modified since the unconditional latch was requested;

means for locating the current index key on the current page if the current index key is on the current page; and means for determining whether the located current index key satisfies the search criteria.

13. The system of claim 12, wherein each key is associated with a location identifier of a record in a database table the key represents, further comprising:

means for determining whether each accessed key satisfies a search criteria; and means for returning the location identifier associated with each key that satisfies the search criteria when reverse scanning through the pages of the index.

14. The system of claim 12, further comprising:

means for performing the following steps when the requested shared latch on the previous page is returned in response to the request for the conditional shared latch;

(i) accessing the previous page prior to the current page;

(ii) accessing a last key on the previous page, wherein the accessed previous page becomes the current page and the accessed last key becomes the current key in continuing the reverse index scan.

15. The system of claim 12, further comprising:

means for accessing the key prior to the current key on the current page after determining whether the current index key satisfies the search criteria and if the current index key is not the first key on the current page, wherein the accessed prior key becomes the current key in continuing the reverse index scan.

16. The system of claim 12, further comprising:

means for determining whether the previous page was involved in a structural modification if the current page was not modified; and means for accessing a last key on the previous page if the previous page was not involved in a structural modification, wherein the accessed previous page becomes the current page and the accessed last key becomes the current key in continuing the reverse index scan.

17. The system of claim 16, further comprising:

means for saving a sequence number for the current page and page numbers of the current page and previous page after the shared latch is not returned in response to the conditional shared latch and before requesting the unconditional shared latches on the current page and the previous page, wherein the means for determining whether the current page was modified comprises determining whether the sequence number for the current page has changed, and wherein the means for determining whether the previous page was involved in a structural modification comprises determining whether the next pointer for the previous page points to the saved page number of the current page.

18. The system of claim 16 further comprising:

means for saving the current index key and requesting a tree latch to prevent another process from structurally modifying pages in the tree if the previous page was involved in a structural modification;

means for determining a prior non-leaf page that includes the saved current index key after receiving the tree latch; and means for traversing forward from the determined non-leaf node to a leaf page including the saved current index key.

19. The system of claim 18, further comprising:

means for saving in a page stack information on the non-leaf pages traversed including key bounds of the non-leaf pages when initially traversing the tree to access the current page, wherein a relationship of the non-leaf pages can be determined from the page stack, and wherein the means for determining the prior non-leaf node that includes the current index key comprises using the page stack to determine a closest non-leaf page including the saved current index.

20. The system of claim 18, further comprising:

means for accessing a previous key in the leaf page or a previous leaf page after traversing forward to the leaf page including the current index page; and means for releasing the tree latch after accessing the previous key.

21. The system of claim 12, wherein the tree comprises a B-tree with one or more levels of non-leaf pages that include keys and pointers to a path to one or more leaf pages including the keys.

22. The system of claim 12, wherein the unconditional latch on the current page is requested after receiving the unconditional latch on the previous page.

23. A program for performing a reverse scan of an index implemented as a tree of pages, wherein each leaf page includes one or more ordered index keys and previous and next pointers to the previous and next pages, respectively, wherein the scan is searching for keys in the leaf pages that satisfy the search criteria, wherein the program comprises code implemented in a computer readable medium, wherein the program code is capable of causing a processor to perform:

if a current index key is a first key on a current page, then requesting a conditional shared latch on a previous page prior to the current page;

if the requested conditional shared latch is not granted, then releasing the latch on the current page and requesting unconditional latches on the previous page and the current page;

after receiving the latch on the previous and current pages in response to requesting the unconditional latches, then determining whether the current index key is on the current page if the current page was modified since the unconditional latch was requested;

locating the current index key on the current page if the current index key is on the current page; and determining whether the located current index key satisfies the search criteria.

24. The program of claim 23, wherein each key is associated with a location identifier of a record in a database table the key represents, wherein the program code is further capable of causing the processor to perform:

determining whether each accessed key satisfies a search criteria; and returning the location identifier associated with each key that satisfies the search criteria when reverse scanning through the pages of the index.

25. The program of claim 23, wherein the program code is further capable of causing the processor to perform:
   if the requested shared latch on the previous page is returned in response to the request for the conditional shared latch, then performing:
      (i) accessing the previous page prior to the current page;
      (ii) accessing a last key on the previous page, wherein the accessed previous page becomes the current page and the accessed last key becomes the current key in continuing the reverse index scan.

26. The program of claim 23, wherein the program code is further capable of causing the processor to perform:
   if the current index key is not the first key on the current page, then after determining whether the current index key satisfies the search criteria, accessing the key prior to the current key on the current page, wherein the accessed prior key becomes the current key in continuing the reverse index scan.

27. The program of claim 23, wherein the program code is further capable of causing the processor to perform:
   determining whether the previous page was involved in a structural modification if the current page was not modified; and
   if the previous page was not involved in a structural modification, then accessing a last key on the previous page, wherein the accessed previous page becomes the current page and the accessed last key becomes the current key in continuing the reverse index scan.

28. The program of claim 27, wherein the program code is further capable of causing the processor to perform:
   after the shared latch is not returned in response to the conditional shared latch and before requesting the unconditional shared latches on the current page and the previous page, saving a sequence number for the current page and page numbers of the current page and previous page, wherein determining whether the current page was modified comprises determining whether the sequence number for the current page has changed, and wherein determining whether the previous page was involved in a structural modification comprises determining whether the next pointer for the previous page points to the saved page number of the current page.

29. The program of claim 27, wherein the program code is further capable of causing the processor to perform:
   if the previous page was involved in a structural modification, then saving the current index key and requesting a tree latch to prevent another process from structurally modifying pages in the tree;
   after receiving the tree latch, determining a prior non-leaf page that includes the saved current index key; and
   traversing forward from the determined non-leaf node to a leaf page including the saved current index key.

30. The program of claim 29, wherein the program code is further capable of causing the processor to perform:
   after traversing forward to the leaf page including the current index page, accessing a previous key in the leaf page or a previous leaf page; and
   releasing the tree latch after accessing the previous key.

31. The program of claim 23, wherein the program code is further capable of causing the processor to perform:
   when initially traversing the tree to access the current page, saving in a page stack information on the non-leaf pages traversed including key bounds of the non-leaf pages, wherein a relationship of the non-leaf pages can be determined from the page stack, and wherein determining the prior non-leaf node that includes the current index key comprises using the page stack to determine a closest non-leaf page including the saved current index.

32. The program of claim 23, wherein the tree comprises a B-tree with one or more levels of non-leaf pages that include keys and pointers to a path to one or more leaf pages including the keys.

33. The program of claim 23, wherein the unconditional latch on the current page is requested after receiving the unconditional latch on the previous page.

* * * * *

UNITED STATES PATENT AND TRADEMARK OFFICE
CERTIFICATE OF CORRECTION

PATENT NO. : 6,647,386 B2
DATED : November 11, 2003
INVENTOR(S) : Robert J. Hollines, III et al.

Page 1 of 1

It is certified that error appears in the above-identified patent and that said Letters Patent is hereby corrected as shown below:

Column 4,
Line 8, insert paragraph -- The database program 4 includes a query engine 20 component and an index manager 22 component. The index manager 22 manages scanning operations on the index by initiating threads to perform a particular index scan. Indexes provide two useful properties for the query engine 20, an associate retrieval property and an ordering property. The associate retrieval property means that the index can be used to quickly find rows that have a given value. This is useful for evaluating predicates on the key columns. The ordering property means that the index can be used to retrieve all the rows of a table in the order of the key value. --.

Column 5,
Lines 29-36, delete paragraph starting as, "Morever, in preferred embodiments…" and ending as, "…indicating the key bounds of the page."

Signed and Sealed this

Fourth Day of April, 2006

JON W. DUDAS
*Director of the United States Patent and Trademark Office*